United States Patent Office 3,373,490
Patented Mar. 19, 1968

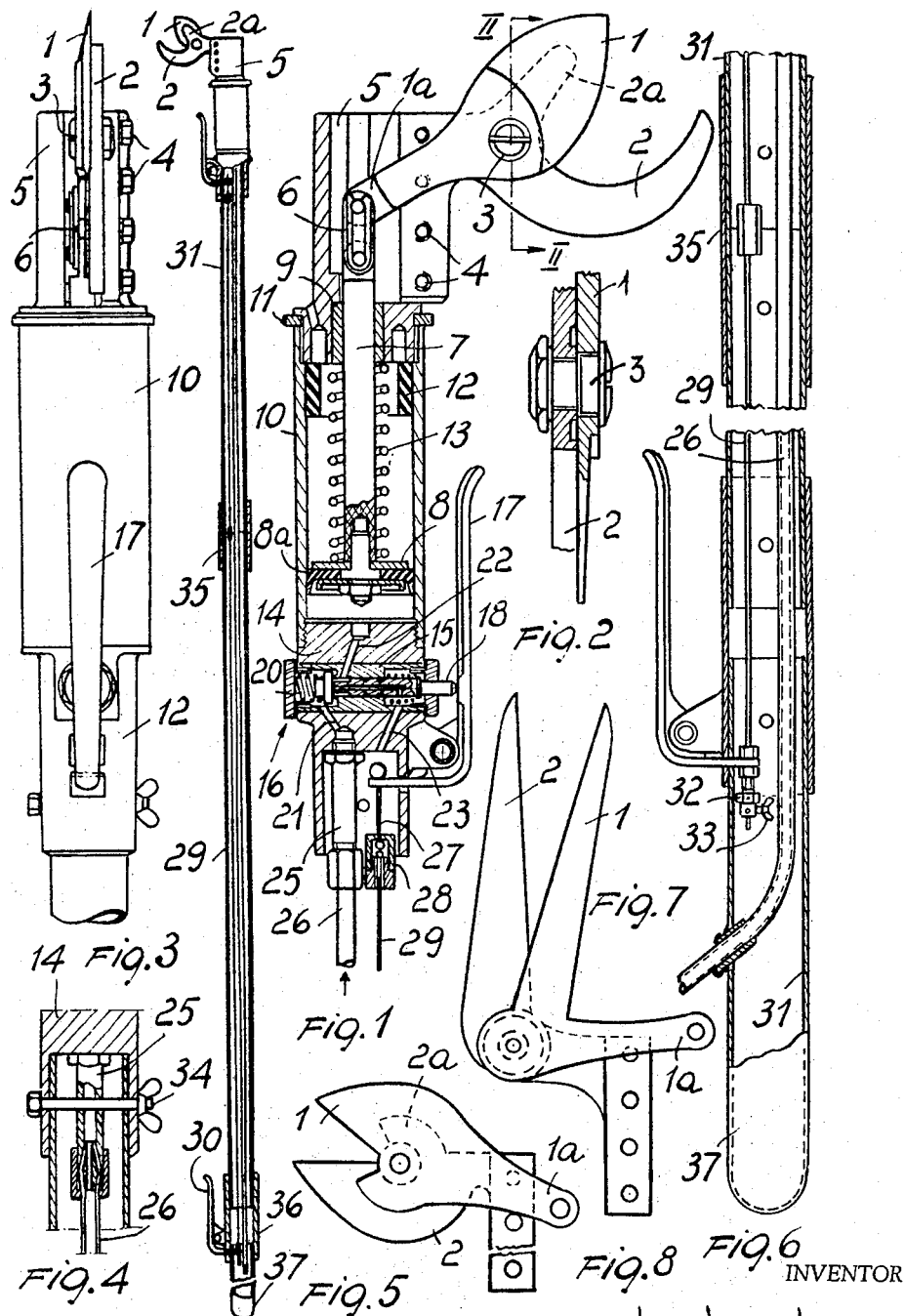

3,373,490
PNEUMATICALLY ACTUATED SHEARS
WITH TWO CONTROLS
Ernesto Lendaro, Via Carducci 19, Udine, Italy
Filed Mar. 21, 1966, Ser. No. 535,965
Claims priority, application Italy, Mar. 23, 1965,
6,769/65, Patent 699,956
2 Claims. (Cl. 30—228)

ABSTRACT OF THE DISCLOSURE

This invention relates to a pneumatically operated shears cutting device for cutting tree branches. The device basically comprises a pair of blades, one fixed and one movable, mounted on a piston cylinder. The movable blade is transmissively connected to a pneumatic power source and is thereby caused to move relative to the fixed blade and effect a cutting action. The length of the device may be adjusted by the addition or removal of cylinder extension sections.

---

The present invention relates to compressed air actuated shears and more particularly to remote controlled shears for pruning or lopping ligneous plants and the like.

It is known that trees and the like are pruned by means of very simple tools such as small saws, axes, gardening knives or shears which although simple and cheap are some time dangerous and unpractical use. With such tools it is impossible to cut branches developing at a height which cannot be normally reached from the ground. Ladders must then be used or the user has to climb up the tree to be pruned. The pruner has thus to show skill and strength because there is always the danger of falling.

It is the main object of the present invention to provide pneumatic shears which eliminate the above mentioned inconveniences and make it possible to carry out an easy and rapid pruning.

It is another object of the present invention to provide pneumatically actuated shears which may be remote controlled.

Another object of this invention is that such shears cut instantaneously even branches having a diameter of a few centimeters.

It is another object of this invention to provide curved blade shears allowing a maximum penetration of the cutting blade into the branch to be cut, taking up the minimum energy.

It is another object of this invention to provide pneumatically actuated shears which have a simple and safe operation.

These and still further objects which will be better apparent hereinbelow are attained by pneumatically actuated shears according to the invention comprising a stationary back blade member projecting from a support end element, a movable blade member pivotably mounted on said back blade, a cylinder secured to said support end element, a piston in said cylinder transmissively connected to the tang of said blade member at least one compressed air duct connected to at least one end of said cylinder, and means for allowing a reciprocating motion of said piston in said cylinder, valve means being provided for controlling the compressed air flow into said cylinder.

Further characteristic features and advantages of the invention will become more apparent from the following detailed description of preferred non-limiting embodiments of pneumatic shears according to the present invention when taken in conjunction with the accompanying drawing, in which:

FIG. 1 is a perspective view partially in section of compressed air actuated shears of curved blade type according to the invention;

FIG. 2 is a sectional view taken along line II—II of FIG. 1;

FIG. 3 is a front elevation view of the pneumatic shears shown in FIG. 1;

FIG. 4 is a detailed view of component parts partially shown in FIG. 1;

FIG. 5 is a partially sectional view of shears according to the invention provided with auxiliary means for remote control of the same;

FIG. 6 is a detailed sectional view of the auxiliary controlling means shown in FIG. 5; and FIGS. 7 and 8 show two different embodiments of cutting blades of shears according to the invention.

With reference to the FIGURES 1–6 number 1 indicates a movable blade which is slidable past a back blade 2 on which it is pivotally mounted at 3. The blade 1 has a limited thickness to allow a maximum penetrability into the branch to be cut and an enlarged shape for the required strength.

Furthermore owing to the particular curvature of the back blade 2 the branches to be cut may be positioned very close to the fulcrum 3 of blade 1 thus offering a decreased resistance to the cut. Back blade 2 is provided also with a projecting lug 2a which form a guide for the blade 1 keeping it clear of lateral bendings and deformations resulting from an uncorrect use.

Through a number of bolts 4 the back blade 2 is secured to a support end element 5. The tang 1a of blade 1 is connected to link 6 connected in turn to a piston rod 7. The latter is secured to a piston 8 provided with seal ring 8a and adapted to reciprocate in the cylinder 10.

The function of the link 6 is to allow the kinematic coupling for the tang 1a which upon actuation of rod 7 will be moved along an arc of circle. Rod 7 during its to and fro motion is guided by a bushing 9 located within the lower portion of the support element 5. Said support element is secured to a cylinder 10 by thread and a screw ring 11.

A rubber ring 12 is located inside the cylinder 10 and in abutment engagement with said element 5 and is designed to damp the piston blows. Around rod 7 a helical return spring 13 is provided which urges the piston 8 towards the rest position shown in FIG. 1.

At the lower end of the cylinder 10 a second support element 14 is located which defines a seat 15 where a valve unit 16 is provided and holds a lever 17. The valve unit 16 comprises a hollow push button 18 co-operating with said lever 17, a valve body 19 and a return spring 20.

The pushbutton 18 and body member 19 plug air inlet 21 to the cylinder 10 when the lever 17 is in the rest position, while they plug the air outlet 22 when the lever 17 is wholly depressed. The valve 16 permits also an air exhaust during the return stroke of piston 8 through cavities 22 and 23. At the air inlet 21 and in communication therewith a thread pipe 25 and a duct 26 are provided which are connected in turn to a compressed air supplying device (not shown).

Inside the support member 14 (FIGS. 1 and 6) the lever 17 has at one end thereof a hole in which a rod 27 is secured, said rod being joined by means of a connector 28 of known type to a wire 29 terminating at a second control lever 30. Wire 29 and pipe 26 are housed within a number of extension tube sections 31 consisting of rigid material. The lever 30 has a screw 32 for adjusting the tension of wire 29 and a clamp 33 for fixing the same.

One of the extension sections 31 is secured to the support member 14 through a bolt and nut 34 (FIG. 4). The sections 31 are further connected to one another by means of damping sleeves 35.

A handgrip element 36 is provided at a desired distance from the member 14 which holds the lever 30 through which the pushbutton 18 and thus the blade 1 may be remote controlled.

An end tubular section 37 is connected to the handgrip element 36 for allowing the transversal emergence of the compressed air supply pipe 26.

In FIGS. 7 and 8 there are shown two further embodiments of the shears which may be applied to the support element 5. As may be seen from the said figures the blade and back blade 1 and 2 respectively have a rectilinear cutting edge.

The operation of the pneumatically actuated shears according to the invention is quite simple. By acting onto the appropriate lever 17 or 30 tree branches having a diameter of several centimeters, either they are at a man's arm distance or a distance of a few meters may be cut.

Each element constituting the shears is readily replaceable without necessity of tools and in a few seconds, since each member has been designed so as to simplify any possible replacement or adjustment.

The air supplying device (not shown) is a high pressure cylinder (provided with a reduction unit), or a little trackable or transportable engine-compressor, which through the light plastic pipe 26 transmits compressed air to the piston 8 actuating the stem 7 and hence the cutting blade 1. The shears, easily remotely as well as manually operable, are of such a weight to be comfortably supported by a workman even for a long period. Work rapidity allows also a considerable operating economy.

I claim:

1. A pneumatically operated shears comprising a stationary back blade member, a support end element, said back blade member projecting from and overhanging said support end element; a plurality of engaging means on said support end element for adjustable and replaceable positioning of said back blade member, a movable blade member pivotably mounted on said back blade member, a cylinder secured to said support end element, said back blade member having a projecting lug element facing said movable blade member, a piston in said cylinder, a piston rod within said cylinder and connected at an end to said piston, a linkage member connected to the other end of said piston rod, said linkage member reciprocating in the same axial direction as said piston, a tang integral with said movable blade, said tang being transmissively connected to said linkage member, a body member co-axially secured to the end of said cylinder opposite the end thereof secured to said support end element, a return spring in said cylinder and in abutting engagement with said piston, a manually controlled valve in said body member, said manually controlled valve controlling the flow of compressed air to said cylinder, said manually controlled valve and said return spring allowing the reciprocation of said piston in said cylinder.

2. A pneumatically operated shears according to claim 1 further comprising at least one tubular extension section secured to the end of said body member opposite the end thereof secured to said cylinder, a handgrip member at the opposite end of said at least one tubular extension section, a control member on said handgrip member, a wire in said at least one tubular extension section for connection of said manually controlled valve to said control member and a compressed air pipe inside said tubular extension section for connecting said manually controlled valve to a compressed air source.

References Cited
UNITED STATES PATENTS

| | | | |
|---|---|---|---|
| 1,753,225 | 4/1930 | Walter | 30—250 X |
| 2,075,341 | 3/1937 | Goodman | 30—228 |
| 2,493,696 | 1/1950 | Potstada | 30—228 |
| 2,504,405 | 4/1950 | Fletcher | 30—228 X |
| 2,990,613 | 7/1961 | Keane et al. | 30—180 |

OTHELL M. SIMPSON, *Primary Examiner.*

J. C. PETERS, *Assistant Examiner.*